United States Patent [19]
Pearce

[11] Patent Number: 6,108,274
[45] Date of Patent: Aug. 22, 2000

[54] ACOUSTIC SENSOR AND ARRAY THEREOF

[75] Inventor: Richard E. Pearce, Roanoke, Tex.

[73] Assignee: Innovative Transducers, Inc., Fort Worth, Tex.

[21] Appl. No.: 09/189,068

[22] Filed: Nov. 9, 1998

Related U.S. Application Data

[63] Continuation-in-part of application No. 09/106,654, Jun. 29, 1998, Pat. No. 5,982,708, which is a continuation-in-part of application No. 08/573,423, Dec. 15, 1995, Pat. No. 5,774,423.

[51] Int. Cl.[7] .................................................. H04R 17/00
[52] U.S. Cl. ............................................................ 367/157
[58] Field of Search ............................... 367/174, 173, 367/167, 163, 165, 180, 142, 130, 157, 106, 15; 310/800, 337, 340

[56] References Cited

U.S. PATENT DOCUMENTS

| | | | |
|---|---|---|---|
| 2,632,150 | 3/1953 | Silverman et al. . | |
| 4,023,562 | 5/1977 | Hynecek et al. . | |
| 4,092,628 | 5/1978 | Hall, Jr. | 181/122 |
| 4,281,402 | 7/1981 | Kruka et al. | 367/15 |
| 4,525,645 | 6/1985 | Shirley et al. | 310/337 |
| 4,653,036 | 3/1987 | Harris et al. | 367/170 |
| 4,789,971 | 12/1988 | Powers et al. | 367/152 |
| 4,805,157 | 2/1989 | Ricketts | 367/119 |
| 4,838,088 | 6/1989 | Murakami | 73/724 |
| 5,361,240 | 11/1994 | Pearce | 367/157 |
| 5,371,428 | 12/1994 | Kikuchi et al. | 310/324 |
| 5,774,423 | 6/1998 | Pearce et al. | 367/157 |
| 5,982,708 | 11/1999 | Pearce | 367/157 |

Primary Examiner—Daniel T. Pihulic
Attorney, Agent, or Firm—Madan, Mossman & Sriram P.C.

[57] ABSTRACT

An acoustic sensor having one or more segments are electrically coupled to provide a response corresponding to an acoustic pressure applied to the segments. Each segment contains at least one substrate of a desired shape and at least two active members made from a flexible, resilient piezoelectric material, preferably, a polyvinylidene fluoride material. Each substrate includes an enclosed chamber on an outer surface wherein a first active element is within the chamber and a second active element is sealingly placed on the enclosed chamber. The second active element is preferably bonded to a compliant diaphragm sealed to the substrate to provide the sealed chamber. An output response from the first active member is combined with an output response from the second active member to provide for a combined output response having reduced noise. The second active element is covered with a protective layer of a suitable material, preferably a polymer material.

38 Claims, 7 Drawing Sheets

ACOUSTIC SENSOR AND ARRAY THEREOF

CROSS REFERENCE TO RELATED APPLICATION

This application is a continuation-in-part of U.S. patent application Ser. No. 09/106,654, now U.S. Pat. No. 5,982,708 filed Jun. 25, 1998 entitled "Acoustic Sensor and Array Thereof" (Richard E. Pearce), filed Jun. 29, 1998 which is continuation-in-part of U.S. application Ser. No. 08/573,423, now U.S. Pat. No. 5,774,423, entitled "Acoustic Sensor and Array Thereof" (Richard E. Pearce, et al), filed Dec. 15, 1995.

BACKGROUND OF THE INVENTION

1. Field of the Invention

This invention relates generally to the field of acoustic sensors and more particularly to a novel hydrophone and method of making the same which may be used under great hydrostatic pressure and under severe hydrodynamic conditions.

2. Description of the Related Art

Piezoelectric hydrophones of various configurations have been used in a variety of applications. In geophysical exploration, arrays of hydrophones are used to detect seismic shock waves from the earth's substrata in response to induced shock waves at known locations on the earth. Hydrophones also are used in boreholes to conduct vertical seismic surveys and for a variety of other applications. Acoustic pressure variations across the hydrophone produce electrical signals representative of the acoustic pressure, which are processed for desired applications.

Piezoelectric hydrophones typically contain a piezoelectric material as an active element which produces electrical signals when subjected to acoustic pressures. Ceramic materials such as barium titane or lead zirconate titane have been used in various configurations as one class of piezoelectric materials in hydrophones. U.S. Pat. No. 4,092,628 discloses the use of a thin ceramic wafer that operates in the bender mode. U.S. Pat. No. 4,525,645 shows a unit shaped as a right cylinder that operates in the radial mode. Ceramic materials are brittle and tend to shatter in the presence of a severe shock such as that produced by an explosive charge or air gun commonly employed for conducting seismic surveys over water-covered areas.

Most hydrophones have a depth limit. An excessive overpressure can cause the active element to bend beyond its elastic limit, resulting in signal distortion and ultimate failure of the hydrophone. In the ceramic wafer type hydrophones, an internal stop is sometimes provided to prevent excessive bending of the element. The wafer, however, tends to develop a permanent deformation that degrades the output signal.

Polyvinylidene fluoride ("PVDF") has been used as another class of piezoelectric material in hydrophones. One such material is available under the tradename KYNAR from AMP corporation. The PVDF material is useful as a hydrophone active element because its acoustic impedance is close to that of water and the acoustic wavefields do not produce spurious reflections and diffractions as they do when encountering ceramic piezoelectric elements. The output signals of the PVDF element are many times greater than the signal output of a ceramic material. Also, PVDF material is readily available in various sheet sizes and a wide range of thickness. Such PVDF material may be readily shaped and cut to fit the intended use. Prior to use, the PVDF material is poled or activated in the thickness direction by application of a high electric field at an elevated temperature for a requisite time period. Conductive metal electrodes are evaporated on the opposite sides of the PVDF film as with the ceramic materials.

An external mechanical force applied to the PVDF film results in a compressive or tensile force strain. The PVDF film develops an open circuit voltage (electrical charge) proportional to the changes in the mechanical stress or strain. The charge developed diminishes with time, depending upon the dielectric constant of the film and the impedance of the connected circuitry. By convention, the polarization axis is the thickness axis. Tensile stress may take place along either the longitudinal axis or the width axis.

U.S. Pat. No. 4,653,036 teaches the use of a PVDF membrane stretched over a hoop ring. A metallic backing is attached to the back of the ring and a void between the film and the backing is filled with an elastomer such as silicone. The device operates in the bender mode. U.S. Pat. No. 4,789,971 shows the use of a voided slab of PVDF material sandwiched between a pair of electrodes. A bilaminar construction is also disclosed. A preamplifier is included in the assembly. The transducer operates in the thickness-compressive mode.

A hydrophone array shown in U.S. Pat. No. 4,805,157 consists of multiple layers of PVDF material symmetrically disposed around a stiffener for prevention of flexural stresses. The axis of maximum sensitivity is in the direction transverse to the plane of the layers. This sensor is sensitive to compressive stress.

U.S. Pat. No. 5,361,240, issued to the inventor of this application, discloses a pressure-compensated PVDF hydrophone that contains a hollow mandrel having a concavity at an outer surface. A flexible and resilient piezoelectric film, preferably made from a PVDF material, is wrapped several times around the mandrel over the concavity to act as the active element of the hydrophone. The volume between the surface of the inner layer of the film and the concavity provides a pressure compression chamber. This hydrophone has been found to be responsive to varying hydrodynamic pressure fields but is substantially insensitive to acceleration forces, localized impacts and variations in hydrostatic pressures.

To perform seismic surveys in water-covered areas, one or more arrays of hydrophones, each array having a plurality of serially coupled hydrophones, are deployed on the bottom of a water-covered area or are towed behind a vessel. In bottom cable applications, hydrophones are commonly built as an integral part of the cable. Each hydrophone is hermetically sealed with a suitable material, such as polyurethane. Such cable constructions are not conducive to easy repairs in the field. Defective hydrophone sections are removed and a cable section containing a working hydrophone is spliced in the place of the defective hydrophone. Such repairs are usually less reliable than unitary constructions and require excessive repair time, which can significantly increase the cost of the surveying operations, especially when performing three-dimensional seismic surveys as the down time can cost several thousand dollars per hour. Thus, there has been an unfilled need to provide a hydrophone which is easy to assemble into a hydrophone cable and easy to repair in the field.

The present invention addresses the above-noted problems and provides a segmented hydrophone that preferably utilizes a flexible and resilient piezoelectric material and a method of making same. The hydrophone segments may be combined to form a single hydrophone. The hydrophone segments removably attach to the cable which is suitably configured to accommodate the hydrophone segments. Any hydrophone segment can readily be replaced without requiring any splicing of the cable. The hydrophone is responsive to varying hydrodynamic pressure fields, but is substantially inert to acceleration forces, localized impacts and variations in hydrostatic pressure. The hydrophone of the present invention also provides an output response that substantially reduces unwanted strain response and noise due to the coupled stresses of the cable.

SUMMARY OF THE INVENTION

The present invention provides an acoustic sensor having one or more segments that are electrically coupled to provide a response corresponding to an acoustic pressure applied to the segments. Each segment contains at least one substrate of a desired shape and at least two active members made from a flexible, resilient piezoelectric material. Polyvinylidene fluoride material is preferably used as the piezoelectric active elements. Each substrate includes an enclosed chamber on an outer surface wherein a first active element is within the chamber and a second active element is sealingly placed on the substrate to form the enclosed chamber. The second active element is preferably bonded to a compliant diaphragm sealed to the substrate to provide the sealed chamber. An output response from the first active element is combined with an output response from the second active element to provide for a combined output response having reduced noise. A protective layer of a suitable material covers the second active element.

The sensor of the present invention may be used in hydrophone cables for performing seismic surveys. In such applications, a plurality of spaced sensors made according to the present invention are attached along the length of a suitably configured cable. Each such sensor preferably contains two electrically coupled hydrophone segments are placed on a rigid member placed on the cable. One or both hydrophone segments are coupled to a conductor in the cable, preferably via an under water plug-in connector. The cable is configured to accommodate the hydrophone segments between a nose section and a rear or tail section. One or more of such hydrophone cables are usually arranged in a matrix or an array for performing seismic surveys. The sensor of the present invention, however, may also be used in other applications requiring the use of a hydrophone.

In one embodiment, the substrate has a concavity on an outer surface and the first piezoelectric material is placed on an inner surface of the concavity. The second piezoelectric material is placed over the concavity to define a chamber between the concavity and the second piezoelectric material. In another embodiment, the diaphragm has a standoff ledge and is placed on the outer surface of the substrate to define a chamber between the diaphragm and the outer surface of the substrate. The first piezoelectric material is placed on the outer surface of the substrate within the chamber. The second piezoelectric material is placed over the diaphragm. In a second embodiment, at least two substrates are provided and a damping material is placed between the outer surface of a first substrate and the inner surface of a second substrate. The second substrate includes a concavity on an outer surface wherein a diaphragm is placed over the concavity of the second substrate to define a sealed chamber between the diaphragm and the concavity. The piezoelectric material is placed over the diaphragm. In a third embodiment, at least two substrates are provided. The diaphragm includes the standoff ledge and is placed on the outer surface of a second substrate to define a sealed chamber between the diaphragm having the standoff ledge and the outer surface of the second substrate. A damping material is placed between an outer surface of a first substrate and an inner surface of the second substrate.

Examples of the more important features of the invention thus have been summarized rather broadly in order that the detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For a detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT(S)

Figure 1:
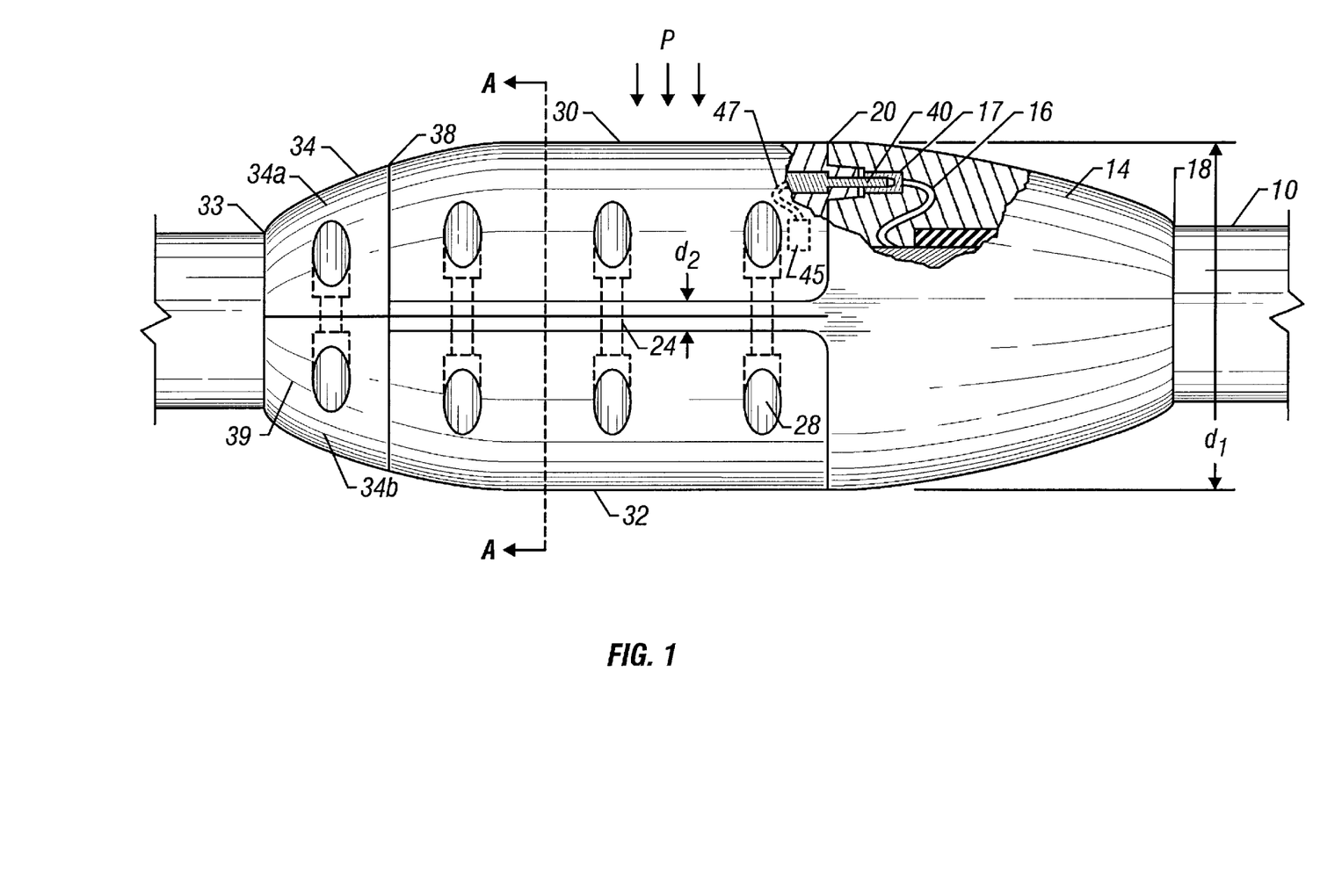
FIG. 1 shows a partial sectional view of a two-segment hydrophone coupled to a cable according to the present invention.

For convenience and simplicity and not as a limitation, the sensor of the present invention is described as a two-segment hydrophone placed on a type of cable typically used for conducting seismic surveys for geophysical prospecting. Accordingly, FIG. 1 shows a partial cross-sectional view the preferred embodiment of a two-segment hydrophone coupled to a cable according to the present invention. FIG. 1A, FIG. 1B, FIG. 1C, and FIG. 1D are cross-sectional views of the hydrophone assembly of FIG. 1 taken along A—A shown therein each showing a different embodiment of the hydrophone assembly. FIG. 2 shows an exploded perspective view of the hydrophone assembly shown in FIG. 1.

Now referring to FIGS. 1, 1A–1D, and 2, the hydrophone assembly includes a cable 10 having a plurality of twisted pairs of conductors 8 placed around a core member 9 along the cable length. The conductors 8 are encased in one or more layers 12 of protective coatings. A molded section 14 is formed over the cable 10 to suitably accommodate hydrophone segments between a nose (front end) 34 having a smoothly increasing cross-section from a point of attachment 33 on the cable 10 to a point 38 and a smoothly decreasing cross-section tail (rear end) 14a that extends from a point 20 of maximal diameter $d_1$ to a point 18 on the cable exterior. The front end 34 preferably has a higher slope than the tail end 14a to reduce the noise effect due to hydrodynamic turbulence produced when the cable 10 is pulled under water. Longitudinal flanges 22a and 22b, each having a desired width $d_2$ extends axially along the cable 10 from the maximal diameter point 20 up to the point 38 on opposite sides of the cable 10. Each flange contains a plurality of holes 24 for accommodating therein suitable tying elements such as bolts. Conductors 16 taken out from the cable are coupled to a suitable underwater connector 17 for providing electrical connection between the cable 10 and the hydrophone segments. The connector 17 and the conductors 16 are preferably molded in the section 14a exposing only the mating end of the connector 17 to the end 20.

Hydrophone segments 30 and 32, each having an inner surface that substantially conforms to the outer surface of suitable rigid members placed on the cable, are placed over the rigid member juxtaposed with the edge 20. The rigid members provide support for the hydrophone segments and prevent bending of the hydrophones when the cable 10 bends during handling and use. The hydrophone segments 30 and 32 may be conveniently secured on the cable by attaching the segments to the flanges 22 by bolts 26 placed through the holes 24 and corresponding access holes 28 made in the segments 30 and 32. The hydrophone segment 30 contains at least one connector 40 that may be removably connected to the cable connector 17. The connectors 40 and 17 sealingly mate with each other to prevent fluid leakage into the conductors connected to such connectors for carrying electrical signals.

The hydrophone segments 30 and/or 32 may contain a preamplifier 45 suitably coupled between the connector 17 and an active element of the hydrophone (described later) to amplify signals received from the hydrophone segments 30 and 32 prior to transmitting such signals through the cable 10. Hydrophone segments 30 and 32 are electrically coupled to each other by suitable means known in the art, such as connectors.

The nose 34 preferably has two halves 34a and 34b, each such half having an inner surface that substantially conforms to the cable outer surface, are placed against the hydrophone segments 30 and 32 and securely attached to the cable 10 by a suitable means such as bolts. The outer surface of the nose 34 preferably has a smooth surface 39 extending from the cable diameter to the diameter of the hydrophone segments at the end 38. The hydrophone segments 30 and 32 may be easily removed from the cable 10 by removing the nose section 34 and the bolts 26 to repair or replace a particular hydrophone segment. Alternatively, the nose 33 is comprised of a single section having an inner surface that substantially conforms to the cable outer surface, and is placed against the hydrophone segments 30 and 32. The nose 33 is securely attached to the cable 10 and hydrophone segments 30 and 32 using the screw threads 35 on the nose 33 which attach to suitable matching screw threads 35 on the hydrophone segments 30 and 32. A suitable attachment means, such as bolts, may additionally be used.

The above-described cable hydrophone utilizes two hydrophone segments attached around a cable. One segment contains a preamplifier and a connector electrically coupling the hydrophone to a conductor take-out from the cable. Although the cable hydrophone described herein has two segments, the hydrophone according to the present invention, however, may contain one or more segments that are electrically coupled to each other. In certain applications, it may be desirable to utilize more than two hydrophone segments placed around the cable. In such cases, provision is made for placing the desired number of segments around the cable in a manner similar to that described above. The elements and construction of the hydrophone segments will now be described while referring to FIGS. 1–6.

Figure 4:
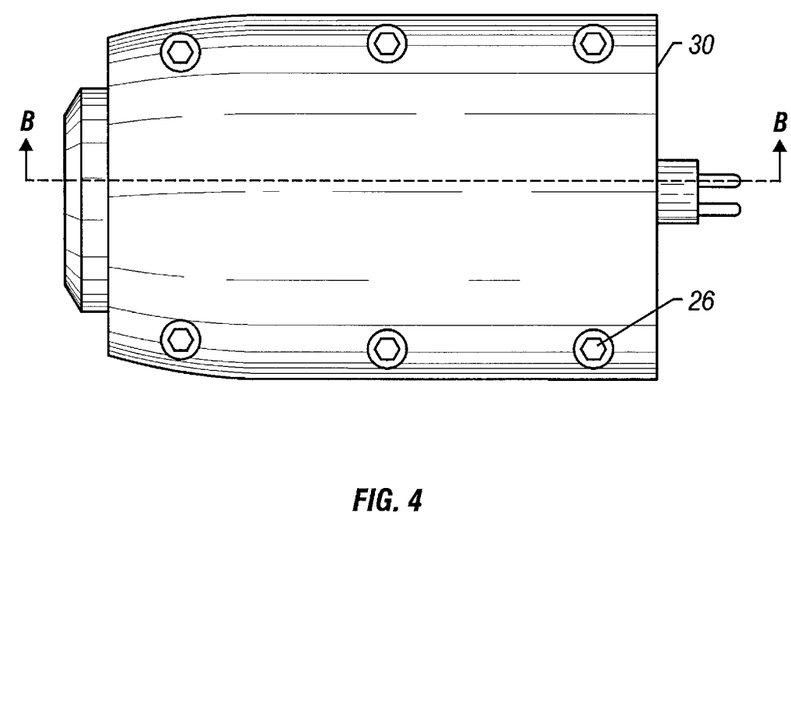
FIG. 4 shows a top view of segment 30 of the hydrophone shown in FIG. 1 having a plug-in connector for electrically coupling such segment to the cable.

FIG. 4 shows a plan view of the hydrophone segment 30 shown in FIG. 1 and FIGS. 5A–5C show cross-sectional view taken along B—B of the hydrophone segment 30 shown in FIG. 4.

Figure 1A:
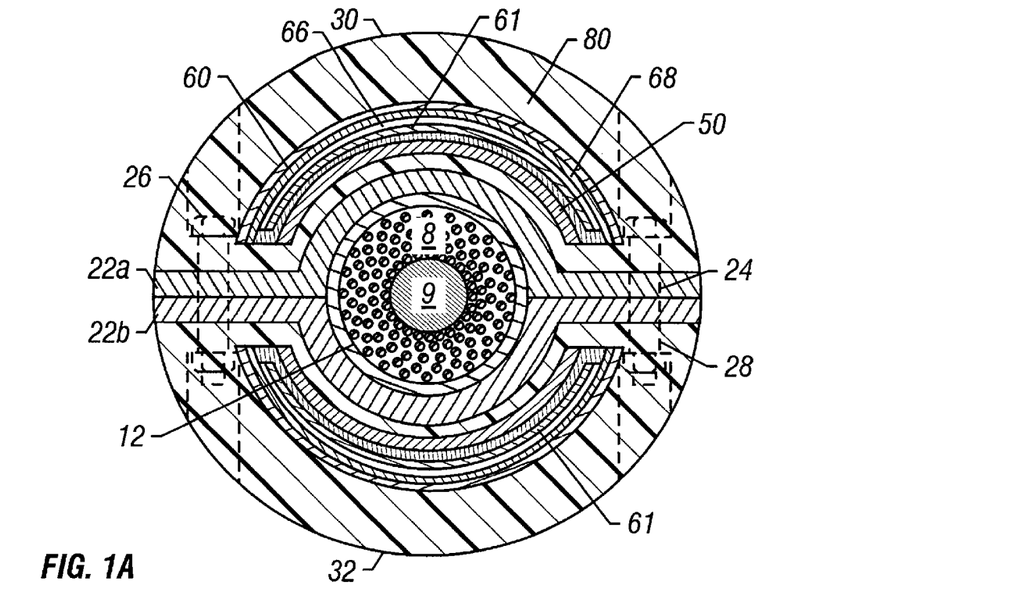
FIG. 1A shows a cross-sectional view of a first embodiment of the hydrophone shown in FIG. 1 taken along A—A.
Figure 2:
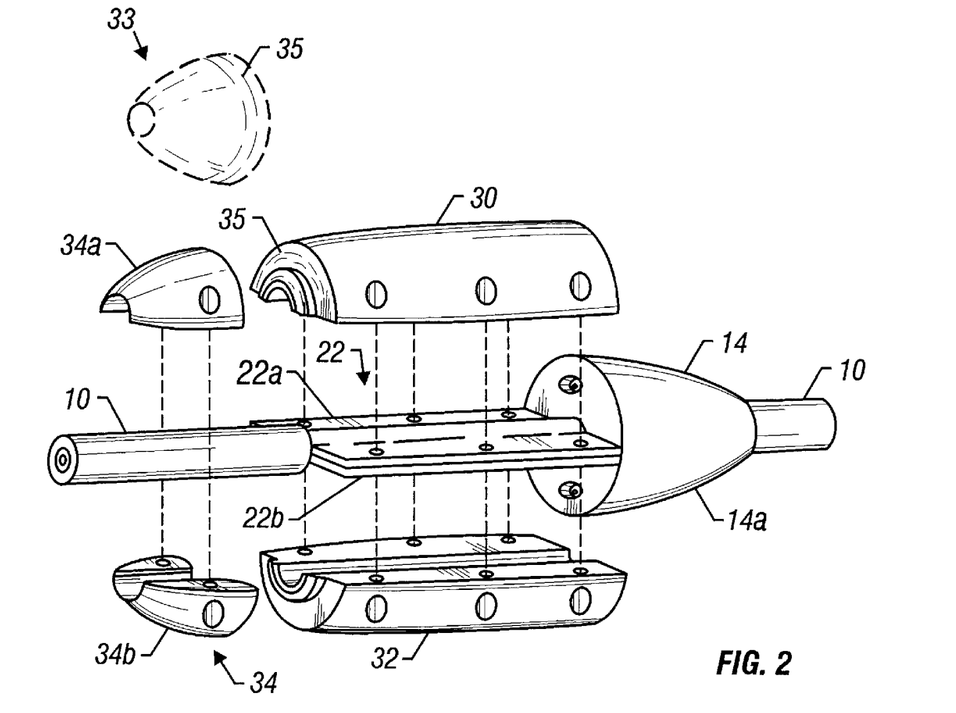
FIG. 2 shows an exploded perspective view of certain elements of the hydrophone of FIG. 1.
Figure 3:
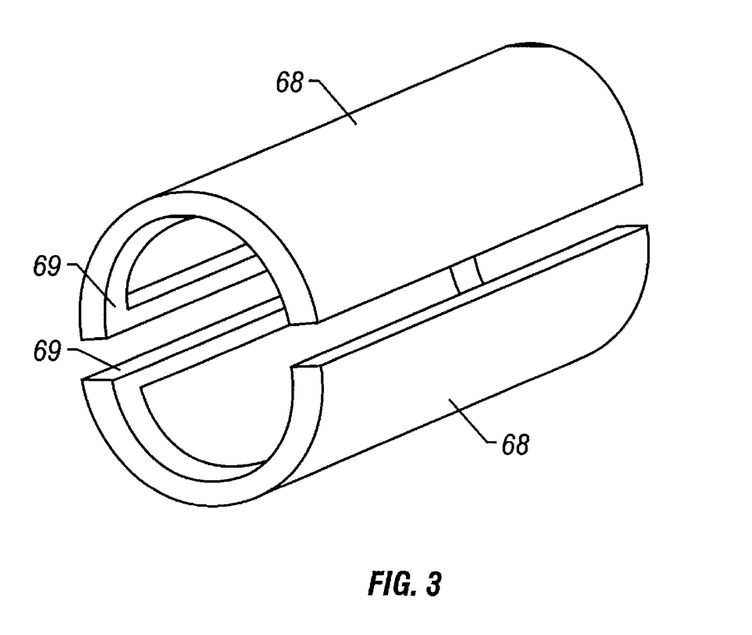
FIG. 3 shows a diaphragm having a standoff ledge as illustrated in FIGS. 1B and 1D.
Figure 5A:
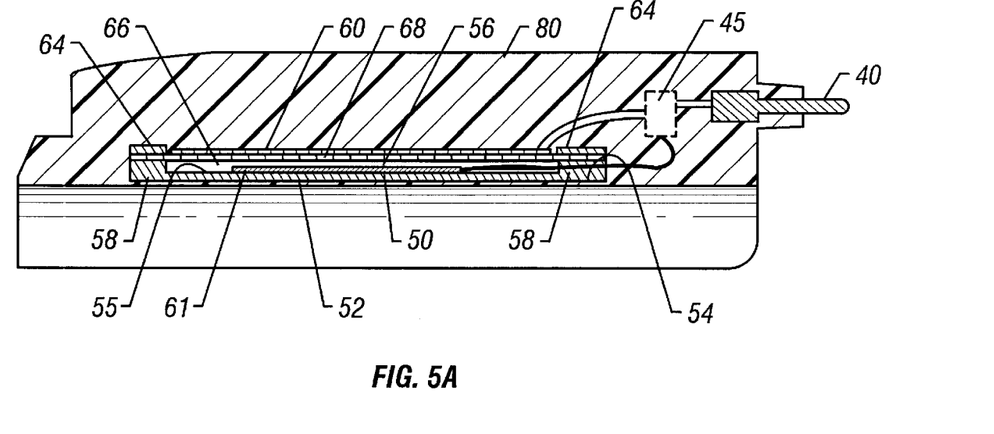
FIG. 5A shows a sectional view of the first embodiment of the hydrophone segment shown in FIG. 4 taken along B—B.

FIGS. 1A and 5A show a first embodiment of the hydrophone of the present invention including a mandrel or a substrate 50 having a concavity 56 on an outer surface 54 and including an inner surface 52 that preferably conforms to the surface on which such segment is intended to be mounted. In the case of the cable hydrophone shown in FIG. 1, the substrate 50 has a concave inner surface that conforms to the outer surface of a rigid member mounted on the outer surface of the cable 10. The concavity 56 is of a desired shape and depth and is bounded by shoulders 58. A rectangular concavity 56 is preferred for use in the cable hydrophones. The depth of the concavity 56 depends on the desired application.

The concavity 56 is preferably covered with a compliant diaphragm 68 made from a suitable polymer material, such as polycarbonate. The size of the diaphragm 68 is sufficient to cover the entire concavity 56. The diaphragm 68 is hermetically sealed at the shoulders 58 by a suitable means, such as an adhesive or a clamp, placed around the entire periphery of the concavity 56 to form an enclosed or sealed space or chamber 66 between the diaphragm 68 and the concavity 56.

Figure 1B:
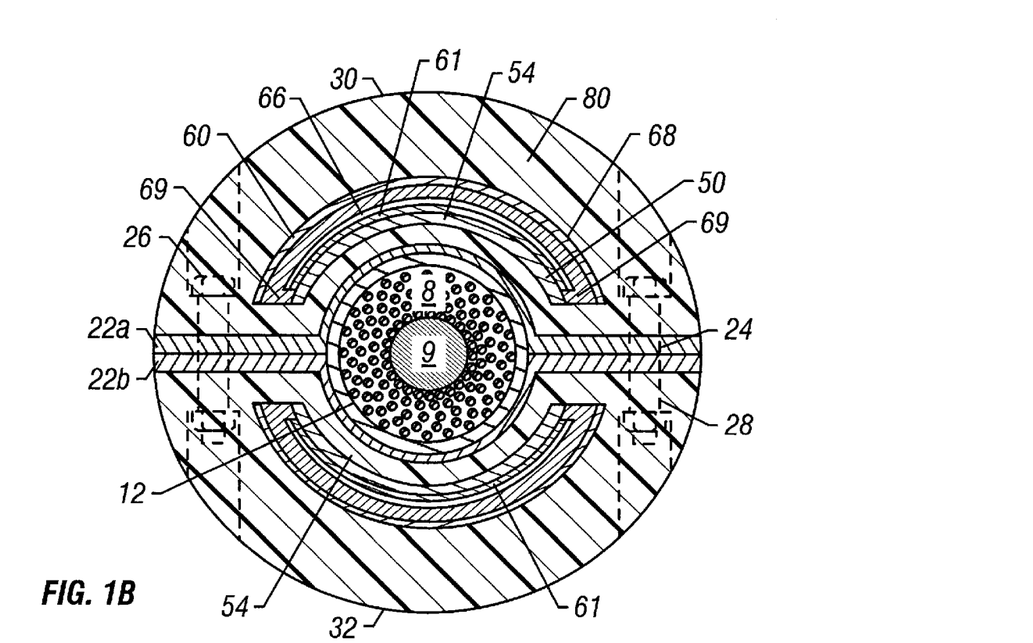
FIG. 1B shows a cross-sectional view of a second embodiment of the hydrophone shown in FIG. 1 taken along A—A.
Figure 5B:
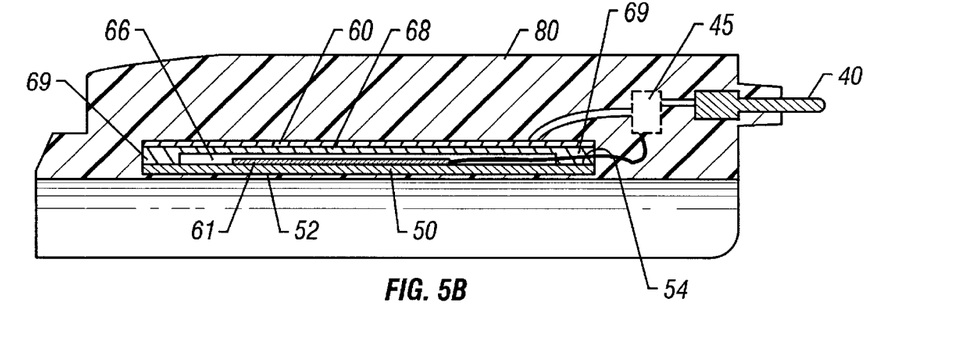
FIG. 5B shows a sectional view of the second embodiment of the hydrophone segment shown in FIG. 4 taken along B—B.

FIGS. 1B and 5B show a second embodiment of the hydrophone of the present invention including a compliant diaphragm 68 having a standoff ledge 69 and made from a suitable polymer material, such as polycarbonate. The diaphragm 68 having the standoff ledge 69 is more clearly shown in FIG. 3. The hydrophone segment contains a mandrel or a substrate 50 including an inner surface 52 that preferably conforms to the surface on which such segment is intended to be mounted. In the case of the cable hydrophone shown in FIG. 1, the substrate 50 has a concave inner surface that conforms to the outer surface of a rigid member mounted on the outer surface of the cable 10.

The diaphragm 68 is place on the outer surface 54 of the substrate 50 to define an enclosed chamber 66 between the diaphragm 68 and standoff ledge 69 and the outer surface 54 of the substrate 50. The size of the diaphragm 68 is sufficient to cover the entire outer surface 54 of the substrate 50. A rectangular chamber 66 is preferred for use in the cable hydrophones. The depth of the chamber 66 depends upon the desired application. The diaphragm 68 is hermetically sealed at the standoff ledge 69 by a suitable means, such as an adhesive or a clamp, placed around the entire periphery of the standoff ledge 69 to form a sealed space or chamber 66 between the diaphragm 68 and the outer surface 54 of the substrate 50. The use of the standoff ledge 69 on the diaphragm 68 allows for the use of un-machined tubing for manufacturing the substrate 50. Forming the standoff ledge 69 into the molded diaphragm 68 provides a cost efficient method of manufacturing and assembling of the hydrophone.

Figure 1C:
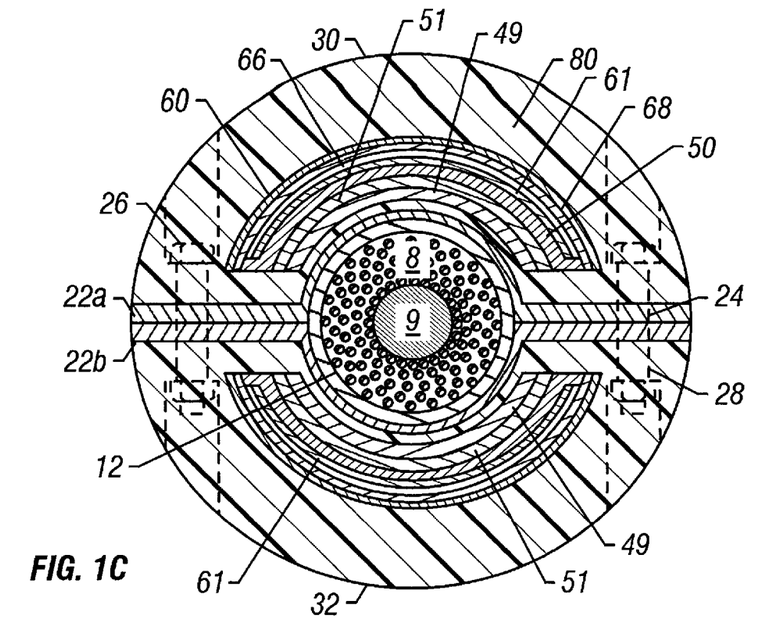
FIG. 1C shows a cross-sectional view of a third embodiment of the hydrophone shown in FIG. 1 taken along A—A.
Figure 5C:
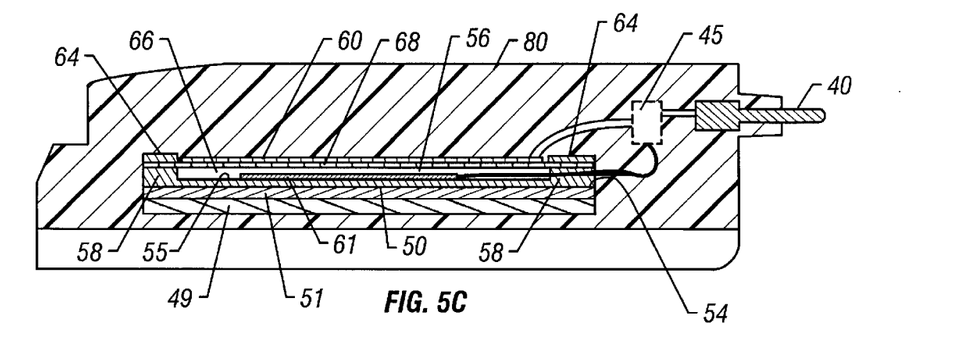
FIG. 5C shows a sectional view of the third embodiment of the hydrophone segment shown in FIG. 4 taken along B—B.

FIGS. 1C and 5C show a third embodiment of the hydrophone of the present invention including a first substrate 49 and a second substrate 50 having a concavity 56 on an outer surface 54. The first substrate 49 has a concave inner surface that conforms to the outer surface of the rigid member mounted on the outer surface of the cable 10 and the second substrate 50 has a concave inner surface that conforms to the outer surface of the first substrate 49. The outer surface 54 of the second substrate 50 has a concavity 56 of a desired shape and depth bounded by shoulders 58. A rectangular concavity 56 is preferred for use in the cable hydrophones. The depth of the cavity 56 depends upon the desired application.

A damping compound or damping material 51, such as a polyurethane, or other suitable elastomeric compound, is placed between the outer surface of the first substrate 49 and the inner surface of the second substrate 50 to isolate energy present in the cable 10 and provide for vibration damping. Preferably, the first substrate 49 is made of an aluminum material and the second substrate 50 of a carbon fiber material. However, both substrates can be made of aluminum material, carbon fiber material, or other suitable stiff material. Preferably, the first substrate 49 is thicker in size than the second substrate 50. Alternatively, one or more additional substrates are used including a damping material placed between each additional substrate to provide further vibration damping.

The concavity 56 is preferably covered by a compliant diaphragm 68 made from a suitable polymer material such as polycarbonate. The size of the diaphragm 68 is sufficient to cover the entire concavity 56. The diaphragm 68 is hermetically sealed at the shoulders 58 by a suitable means 64, such as an adhesive or a clamp, placed around the entire periphery of the concavity 56 to form a sealed chamber or space 66 between the diaphragm 68 and the inner surface of the concavity 56. The diaphragm 68 shown in FIGS. 1A and 5A, and FIGS. 1C and 5C are shown without a standoff ledge, however, alternatively, a diaphragm having a standoff ledge may be used with the substrate having a concavity to form a sealed chamber.

Figure 1D:
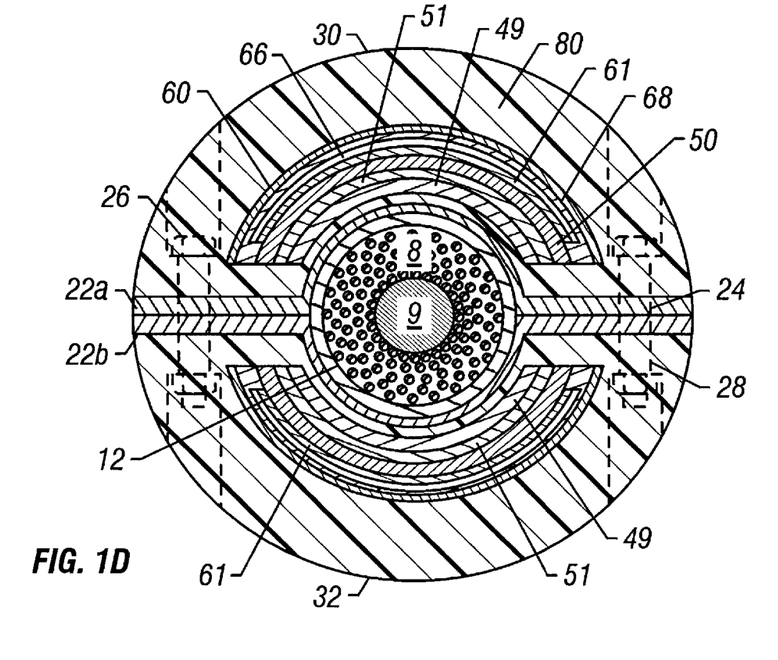
FIG. 1D shows a cross-sectional view of a fourth embodiment of the hydrophone shown in FIG. 1 taken along A—A.
Figure 5D:
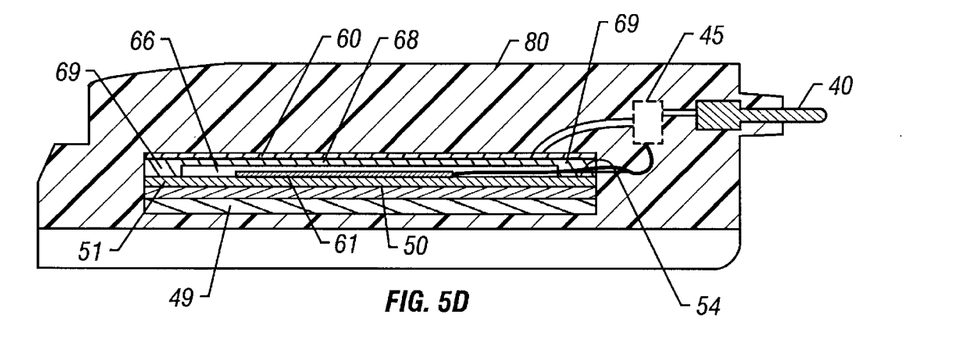
FIG. 5D shows a sectional view of the fourth embodiment of the hydrophone segment shown in FIG. 4 taken along B—B.

FIGS. 1D and 5D show a fourth embodiment of the hydrophone of the present invention wherein the diaphragm 68 having the standoff ledge 69 (shown in greater detail in FIG. 3) is used in a hydrophone having at least two substrates, shown as first substrate 49 and second substrate 50. The diaphragm 68 is hermetically sealed at the standoff ledge 69 by a suitable means, such as an adhesive or a clamp, placed around the entire periphery of the standoff ledge 69 to form a sealed space or chamber 66 between the diaphragm 68 and an outer surface 54 of the second substrate 50.

The first substrate 49 has a concave inner surface that conforms to the outer surface of the rigid member mounted on the outer surface of the cable 10 and the second substrate 50 has a concave inner surface that conforms to the outer surface of the first substrate 49. The damping material 51 is placed between the outer surface of the first substrate 49 and the inner surface of the second substrate 50 to isolate energy present in the cable 10 and provide for vibration damping. Preferably, the first substrate 49 is made of an aluminum material and the second substrate 50 of a carbon fiber material. However, both substrates can be made of aluminum material, carbon fiber material, or other suitable stiff material. Preferably, the first substrate 49 is also thicker in size than the second substrate 50.

The sealed chamber 66 in each embodiment of the present invention usually is filled with air or an inert gas such as nitrogen either at the ambient pressure or at higher pressure.

In each embodiment of the present invention, a first active element 61 in the form of a thin sheet or film of a flexible resilient piezoelectric material, preferably a polyvinylidene fluoride ("PVDF") material, is located within the chamber 66. For example, the first active element 61 is placed on the inner surface 55 of the concavity 56 (shown in FIGS. 1A and 5A, and 1C and 5C) or the outer surface 54 of the substrate 50 (shown in FIGS. 1B and 5B, and 1D and 5D). The first active element 61 is preferably bonded to the substrate 50. The thickness of the first PVDF film 60 is preferably in the order of 28 microns, although other thicknesses may be used.

Also in each embodiment of the present invention, a second active element 60 in the form of a thin sheet or film of a flexible resilient piezoelectric material, preferably a polyvinylidene fluoride ("PVDF") material, is placed over the diaphragm 68. The second active element 60 is preferably bonded to the diaphragm 68. The thickness of the PVDF film 60 is preferably in the order of 28 microns, although other thicknesses may be used.

The second active member 60 and the diaphragm flex in response to acoustic signals in the form of pressure waves "P" (see FIG. 1). The diaphragm 68 provides spring action to the second active element 60 that defines response of the second active element 60. The first active element 61 is placed directly onto the rigid substrate 50 in the area of the air void to provide a response due to the mechanical flexing of the substrate wherein the acoustic response of the compression axis of the sheet of film of the first active element 61 is minimized. By directly attaching the first active element 61 to the substrate 50, any flex that occurs in the substrate 50 produces a response from the first active element 61 that is 180 degrees out of phase with the flexural response in the hydrophone's acoustic diaphragm, the second active member 60 and the diaphragm. The output response from the first active element 61 and the output response from the second active element 60 are electronically added to provide an output response from the hydrophone which substantially reduces the unwanted strain response and reduces resulting noise due to the coupled stresses of the cable.

To make the hydrophone segment, it may be desirable to first bond first active element 61 to the substrate 50 and then the second active element 60 to the diaphragm 68 and then bond the diaphragm 68 to substrate 50. In an alternative embodiment, the second active element 60 may be placed directly on the concavity 56 shown in FIGS. 1A and 5A, and FIGS. 1C and 5C and hermetically sealed along the shoulders 58.

Figure 6:
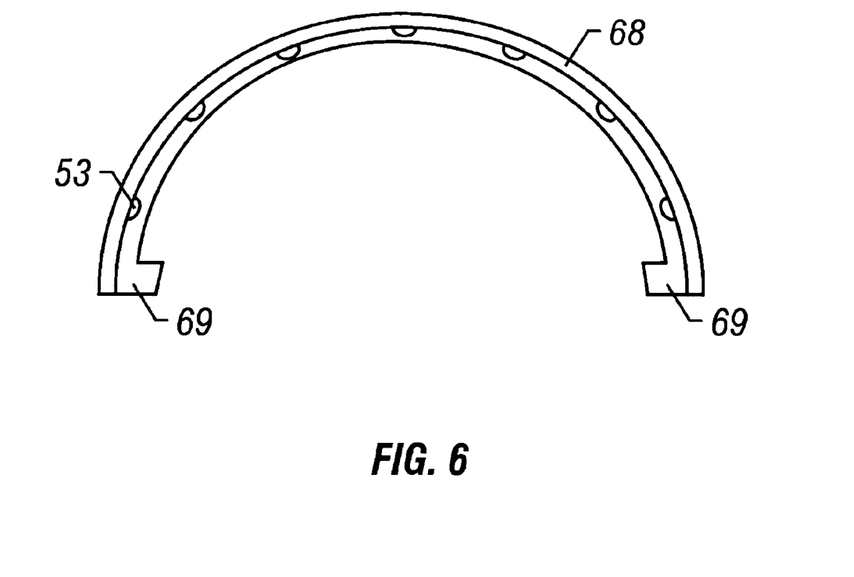
FIG. 6 shows a sectional view of the diaphragm of FIG. 3 including a plurality of convex ribs longitudinally positioned on an inner surface of the diaphragm.

FIG. 6 shows a sectional view of the diaphragm 68 having the standoff ledge 69 and including a plurality of convex ribs 53 longitudinally positioned on an inner surface of the diaphragm 68. The plurality of convex ribs 53 is preferably included on the diaphragm 68 in each embodiment of the present invention. The convex ribs 53 preserve the active element 60 by controlling collapse of the diaphragm 68 under pressure and thereby preventing crumpling of the active element 60. The depth and size of the convex ribs 53 can be adjusted to provide varying control.

Figure 7:
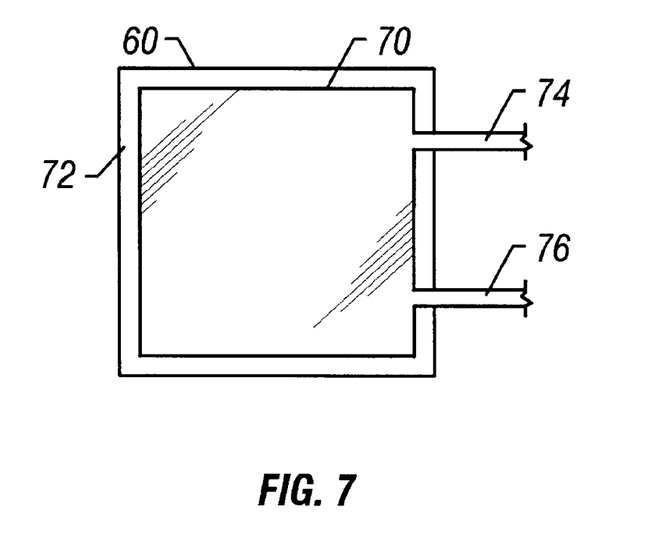
FIG. 7 shows a top view of an active element for use in the hydrophone segments of the present invention.

FIG. 7 shows the electrical connection takeout from the first active member 61. As shown in FIG. 7, a metalized electrode 70 is deposited over both sides of most of the active element 60, leaving an inactive or inert border or edge 72 around the electrode member 70. Evaporated silver or silver ink are most common electrode compositions although other metals, such as gold, may be used. Electrical leads 74 and 76 deliver electrical signals to signal conditioner or preamplifier 45. The signals from the signal conditioner are passed to the connector 40 via the conductor 47. The electrical connection from the second active member 60 (not shown) is preferably accomplished in the same manner as the first active member 61.

Referring back to FIGS. 1–5, the second active element 60 is covered by a layer 80 of a suitable material. For cable hydrophone applications, the second active element 60 and the substrate are preferably encapsulated by a polyurethane material, exposing only the necessary elements, such as the connector 40, to the atmosphere while retaining the overall shape that will provide a snug fit of the assembly shown in FIG. 4 on the cable. Holes 28 that match the holes 24 in the flanges 22a and 22b are provided along the edges of the segment 30 for attaching the segment to the flanges 22a and 22b as described earlier.

In operation, uniformly distributed radial acoustic hydrodynamic transient pressure fields, as represented by the inwardly directed arrows "P" such as shown in FIG. 1, exert compressive stress along the longitudinal and lateral axes of the second active element 60, generating a voltage output in response to pressure variations. Compensation for changes in hydrostatic pressure is provided by the volume of gas in the enclosed chamber 66. As the external hydrostatic pressure increases or decreases, inward contraction or expansion of the flexible resilient piezoelectric second active element 60 creates corresponding changes in the pressure of the gas chamber 66, thus equalizing the internal and external pressures. It has been found that for most of the applications in the field of seismic exploration, a hydrophone having unpressurized air in the chamber produces adequate response.

The first active element 61 generates a voltage output in response to the mechanical flexing of the substrate 180 degrees out of phase with the flexural response of the second active element 60. The voltage output response of the first active element 61 is electronically added with the voltage output response from the second active element 60 to provide an output response from the hydrophone having reduced noise due to the coupled stresses of the cable.

The hydrophone segments 30 and 32 may be configured for optimum electrical output at a desired range of operating depths by adjusting the volumetric capacity of the chamber a larger volume provides for a wider operating range. By reason of its construction, the hydrophone is inherently insensitive to acceleration forces. A random localized impact, such as might be applied by a sharp object, will result in a small signal, but the resulting electrical charge will be dissipated over the entire second active element 60 and become sufficiently attenuated so as be a virtually undetectable. The second active element 60, therefore, is substantially electrically inert to localized mechanical forces. Because of the pressure equalization by the gas in the chamber 66, the second active element is not sensitive to hydrostatic pressure variations.

Thus, the present invention provides a hydrophone having one or more hydrophone segments that are electrically coupled to provide a response corresponding to a hydrodynamic pressure applied to the segments. Each segment contains a chamber on an outer surface that is sealingly enclosed by an second active member made from a flexible, resilient piezoelectric material and includes a first active member made from a flexible, resilient piezoelectric material bonded to a rigid substrate within the chamber. A single segment may be used as a hydrophone or a plurality of segments may suitably configured and electrically coupled to each other to form a hydrophone.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An acoustic sensor comprising:
    a substrate;
    a first piezoelectric material;
    a second piezoelectric material placed on the substrate wherein an enclosed chamber is formed between the second piezoelectric material and the substrate and wherein the first piezoelectric material is within the enclosed chamber; and
    a protective layer placed over the second piezoelectric material.

2. The acoustic sensor as specified in claim 1, wherein an output response from the first piezoelectric material is combined with an output response from the second piezoelectric material to provide for a combined output response having reduced noise.

3. The acoustic sensor as specified in claim 1, wherein the substrate further comprises a concavity on an outer surface wherein the second piezoelectric material is placed over the concavity to form the enclosed chamber.

4. The acoustic sensor as specified in claim 3 further comprising:
    a diaphragm between the second piezoelectric material and the concavity.

5. The acoustic sensor as specified in claim 1 further comprising:
    a diaphragm having a standoff ledge placed on an outer surface of the substrate to form the enclosed chamber and wherein the second piezoelectric material placed over the diaphragm.

6. The acoustic sensor as specified in claim 1 further having a first connector coupled to the first piezoelectric material and a second connector coupled to the second piezoelectric material.

7. The acoustic sensor as specified in claim 1, wherein the first piezoelectric material is a sheet of a polyvinylidene fluoride material.

8. The acoustic sensor as specified in claim 1, wherein the second piezoelectric material is a sheet of a polyvinylidene fluoride material.

9. A sensor array, comprising:
    a cable having a plurality of serially spaced take-out conductors along the length of the cable; and a separate hydrophone placed coupled to each said take-out conductor, each said hydrophone having two segments, each segment having:
   a substrate having an inner surface adapted to be removably attached on the cable;
   a first piezoelectric material;
   a second piezoelectric material placed on the substrate wherein an enclosed chamber is formed between the second piezoelectric material and the substrate and wherein the first piezoelectric material is within the enclosed chamber; and
   an insulating material placed on the second piezoelectric material to seal the second piezoelectric material from the outside environment; and
   wherein the two segments are securely placed around the cable and electrically connected to each other.

10. The sensor array as specified in claim 9, wherein an output response from the first piezoelectric material is combined with an output response from the second piezoelectric material to provide for a combined output response having reduced noise.

11. The sensor array as specified in claim 9, wherein the substrate further comprises a concavity on an outer surface wherein the second piezoelectric material is placed over the concavity to form the enclosed chamber.

12. The sensor array as specified in claim 11 further comprising:
   a diaphragm between the second piezoelectric material and the concavity.

13. The sensor array as specified in claim 9 further comprising:
   a diaphragm having a standoff ledge placed on an outer surface of the substrate to define the enclosed chamber and wherein the second piezoelectric material is placed over the diaphragm.

14. The sensor array as defined in claim 9, wherein the enclosed chamber contains a pressurized inert gas.

15. The sensor array as specified in claim 9, wherein the first piezoelectric material is a sheet of a polyvinylidene fluoride material.

16. The sensor array as specified in claim 9, wherein the second piezoelectric material is a sheet of a polyvinylidene fluoride material.

17. A hydrophone suitable for towing under water by a cable, comprising:
   at least two segments detachably connected to the cable, each said segment having:
      a substrate having an outer surface;
      a first piezoelectric material;
      a second piezoelectric material placed on the outer surface of the substrate wherein an enclosed chamber is formed between the second piezoelectric material and the substrate and wherein the first piezoelectric material is within the enclosed chamber; and
      an encapsulating material placed on the second piezoelectric material to protect the second piezoelectric material from the surrounding environment.

18. The hydrophone as specified in claim 17, wherein an output response from the first piezoelectric material is combined with an output response from the second piezoelectric material to provide for a combined output response having reduced noise.

19. An acoustic sensor comprising:
   a first substrate having an outer surface;
   a second substrate having an outer surface and an inner surface;
   a damping material placed between the outer surface of the first substrate and the inner surface of the second substrate;
   a first piezoelectric material;
   a second piezoelectric material placed on the outer surface of the second substrate to form an enclosed chamber between the second piezoelectric material and the second substrate, wherein the first piezoelectric material is within the enclosed chamber; and
   an encapsulating material placed on the on the second piezoelectric material to protect the second piezoelectric material from the surrounding environment.

20. The acoustic sensor as specified in claim 19, wherein an output response from the first piezoelectric material is combined with an output response from the second piezoelectric material to provide for a combined output response having reduced noise.

21. The acoustic sensor as specified in claim 19, wherein the second substrate further comprises a concavity on the outer surface wherein the second piezoelectric material is placed over the concavity to form the enclosed chamber.

22. The acoustic sensor as specified in claim 21 further comprising:
   a diaphragm between the second piezoelectric material and the concavity.

23. The acoustic sensor as specified in claim 19 further comprising:
   a diaphragm having a standoff ledge placed on the outer surface of the second substrate to define the enclosed chamber and wherein the second piezoelectric material placed over the diaphragm.

24. The acoustic sensor as specified in claim 19 further having a first connector coupled to the first piezoelectric material and a second connector coupled to the second piezoelectric material.

25. The acoustic sensor as specified in claim 19, wherein the first piezoelectric material is a sheet of a polyvinylidene fluoride material.

26. The acoustic sensor as specified in claim 19, wherein the second piezoelectric material is a sheet of a polyvinylidene fluoride material.

27. The acoustic sensor as specified in claim 19, further having one or more additional substrates wherein the damping material is placed between said additional substrates.

28. A sensor array, comprising:
   a cable having a plurality of serially spaced take-out conductors along the length of the cable;
   a separate hydrophone placed coupled to each said take-out conductors, each said hydrophone having two segments, each segment having:
      a first substrate having an outer surface and an inner surface, said inner surface adapted to be removably attached on the cable;
      a second substrate having an outer surface and an inner surface;
      a damping material placed between the outer surface of the first substrate and the inner surface of the second substrate;
      a first piezoelectric material;
      a second piezoelectric material placed on the outer surface of the second substrate to form an enclosed chamber between the second piezoelectric material and the second substrate, wherein the first piezoelectric material is within the enclosed chamber; and
      an insulating material placed on the second piezoelectric material to seal the second piezoelectric material from the outside environment; and wherein the two segments are securely placed around the cable and electrically connected to each other.

29. The sensor array as specified in claim 28, wherein an output response from the first piezoelectric material is combined with an output response from the second piezoelectric material to provide for a combined output response having reduced noise.

30. The sensor array as specified in claim 28, wherein the second substrate further comprises a concavity on the outer surface wherein the second piezoelectric material is placed over the concavity to form the enclosed chamber.

31. The sensor array as specified in claim 30 further comprising:
   a diaphragm between the second piezoelectric material and the concavity.

32. The sensor array as specified in claim 28 further comprising:
   a diaphragm having a standoff ledge placed on the outer surface of the second substrate to define the enclosed chamber and wherein the second piezoelectric material is placed over the diaphragm.

33. The sensor array as defined in claim 28, wherein the enclosed chamber contains a pressurized inert gas.

34. The sensor array as specified in claim 28, wherein the first piezoelectric material is a sheet of a polyvinylidene fluoride material.

35. The sensor array as specified in claim 28, wherein the second piezoelectric material is a sheet of a polyvinylidene fluoride material.

36. The sensor array as specified in claim 28, further having one or more additional substrates wherein the damping material is placed between said additional substrates.

37. A hydrophone suitable for towing under water by a cable, comprising:
   at least two segments detachably connected to the cable, each said segment having:
      a first substrate having an outer surface and an inner surface, said inner surface adapted to be removably attached on the cable;
      a second substrate having an outer surface and an inner surface;
      a damping material placed between the outer surface of the first substrate and the inner surface of the second substrate;
      a first piezoelectric material;
      a second piezoelectric material placed on the outer surface of the second substrate wherein an enclosed chamber is formed between the second piezoelectric material and the second substrate and wherein the first piezoelectric material is within the enclosed chamber;
      an encapsulating material placed on the second piezoelectric material to protect the second piezoelectric material from the surrounding environment.

38. The hydrophone as specified in claim 37, wherein an output response from the first piezoelectric material is combined with an output response from the second piezoelectric material to provide for a combined output response having reduced noise.

* * * * *